United States Patent
Nagase et al.

(10) Patent No.: US 9,543,622 B2
(45) Date of Patent: Jan. 10, 2017

(54) LITHIUM SOLID STATE SECONDARY BATTERY SYSTEM

(75) Inventors: Hiroshi Nagase, Mishima (JP); Shigenori Hama, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 14/234,567

(22) PCT Filed: Jul. 26, 2011

(86) PCT No.: PCT/JP2011/066990
§ 371 (c)(1),
(2), (4) Date: Jan. 23, 2014

(87) PCT Pub. No.: WO2013/014753
PCT Pub. Date: Jan. 31, 2013

(65) Prior Publication Data
US 2014/0197800 A1    Jul. 17, 2014

(51) Int. Cl.
*H02J 7/00*      (2006.01)
*H01M 10/42*     (2006.01)
*H01M 10/052*    (2010.01)
*H01M 10/0562*   (2010.01)
*H01M 4/62*      (2006.01)
*H01M 10/44*     (2006.01)
*H01M 4/36*      (2006.01)

(52) U.S. Cl.
CPC ........... *H01M 10/4257* (2013.01); *H01M 4/62* (2013.01); *H01M 10/052* (2013.01); *H01M 10/0562* (2013.01); *H01M 10/448* (2013.01); *H02J 7/00* (2013.01); *H01M 4/366* (2013.01); *H01M 2300/0068* (2013.01); *Y02E 60/122* (2013.01); *Y02T 10/7011* (2013.01)

(58) Field of Classification Search
CPC ......... H02J 7/00; H01M 10/4257; H01M 4/62
USPC ........................................................ 320/136
See application file for complete search history.

(56) References Cited

U.S. PATENT DOCUMENTS

| | | | |
|---|---|---|---|
| 2004/0157122 A1* | 8/2004 | Naoi et al. | 429/213 |
| 2005/0118496 A1* | 6/2005 | Chang et al. | 429/62 |
| 2010/0203386 A1* | 8/2010 | Chang et al. | 429/220 |
| 2014/0125291 A1 | 5/2014 | Hama et al. | |

FOREIGN PATENT DOCUMENTS

| | | |
|---|---|---|
| CN | 103563160 A | 2/2014 |
| JP | A-2010-225581 | 10/2010 |
| JP | A-2010-225582 | 10/2010 |
| JP | A-2012-248414 | 12/2012 |
| JP | A-2013-30357 | 2/2013 |

* cited by examiner

*Primary Examiner* — Suchin Parihar
(74) *Attorney, Agent, or Firm* — Oliff PLC (57) ABSTRACT

The main object of the present invention is to provide a lithium solid state secondary battery system capable of restoring the decrease of output characteristics of a lithium solid state secondary battery without deteriorating an anode. The present invention attains the above-mentioned object by providing a lithium solid state secondary battery system including a lithium solid state secondary battery and an overdischarge treating unit, wherein an anode active material layer of the above-mentioned lithium solid state secondary battery contains an anode active material and a sulfide solid electrolyte material containing Li, A (A is at least one kind of P, S, Ge, Al and B) and S and having an ortho-composition, and the above-mentioned anode current collector includes a metal.

18 Claims, 3 Drawing Sheets

LITHIUM SOLID STATE SECONDARY BATTERY SYSTEM

TECHNICAL FIELD

The present invention relates to a lithium solid state secondary battery system capable of restoring the decrease of output characteristics without deteriorating an anode.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium secondary battery has been presently noticed from the viewpoint of a high energy density among various kinds of batteries.

Liquid electrolyte containing a flammable organic solvent is used for a presently commercialized lithium secondary battery, so that the installation of a safety device for restraining temperature rise during a short circuit and the improvement in structure and material for preventing the short circuit are necessary therefor. On the contrary, a lithium secondary battery solidified by replacing the liquid electrolyte with a solid electrolyte layer is conceived to intend the simplification of the safety device and be excellent in production cost and productivity for the reason that the flammable organic solvent is not used in the battery.

Also, it is known that a secondary battery may be repeatedly charged and discharged but battery performance decreases due to overdischarge. Thus, an ordinary secondary battery is provided with a means of measuring voltage of the battery during discharge to stop the discharge at a predetermined voltage. On the other hand, in Patent Literature 1, a battery module not provided with an overdischarge protective means of preventing a lithium secondary battery from being overdischarged is disclosed; in Patent Literature 2, a conductive device not provided with an overdischarge protective means of preventing a lithium secondary battery from being overdischarged is disclosed.

Citation List

Patent Literatures

Patent Literature 1: Japanese Patent Application Publication (JP-A) No. 2010-225581

Patent Literature 2: JP-A No. 2010-225582

SUMMARY OF INVENTION

Technical Problem

A solid state secondary battery has the problem that the repetition of charge and discharge causes internal resistance to increase and output characteristics to decrease. Also, a solid state secondary battery has the problem that the preservation at high temperature (such as approximately 60° C.) causes internal resistance to increase and output characteristics to decrease. In addition, it is ordinarily difficult to restore output characteristics which once decreased.

Through earnest studies in view of the above-mentioned problems, the inventors of the present invention have obtained findings that positive (intentional) overdischarging is unexpectedly effective for restoring output characteristics which once decreased. Then, the inventors of the present invention which obtained the above-mentioned findings have attempted further development of a solid state secondary battery system capable of restoring the decrease of output characteristics by utilizing overdischarge of a solid state secondary battery.

Incidentally, a sulfide solid electrolyte material is known as a solid electrolyte material used for a solid state secondary battery. The sulfide solid electrolyte material is so high in Li ion conductivity as to be useful for intending higher output of the battery; for example, in Patent Literature 1, an $Li_2S$—$P_2S_5$-based material is disclosed, and it is disclosed that a crystalline material ($Li_7P_3S_{11}$) obtained by mixing at $Li_2S:P_2S_5=70:30$ on a molar basis to further heat-treat is particularly preferable among the $Li_2S$—$P_2S_5$-based materials.

However, in the case where a lithium solid state secondary battery using the above-mentioned sulfide solid electrolyte material as a material for an anode active material layer is adopted for the above-mentioned solid state secondary battery system, the problem is that an anode occasionally deteriorates due to overdischarge and the lithium solid state secondary battery may not be used.

Therefore, the main object of the present invention is to provide a lithium solid state secondary battery system capable of restoring the decrease of output characteristics of a lithium solid state secondary battery without deteriorating an anode.

Solution to Problem

In order to achieve the above-mentioned object, through earnest studies, the inventors of the present invention have obtained findings that an anode potential increases by overdischarging and consequently a reaction (a sulfidation reaction) between a sulfur component of a sulfide solid electrolyte material contained in an anode active material layer and a metallic anode current collector causes the deterioration of an anode of a lithium solid state secondary battery. Also, when the inventors of the present invention studied about reactivity between various sulfide solid electrolyte materials and metal used appropriately for an anode current collector, they have obtained findings that even overdischarge of a lithium solid state secondary battery causes a sulfidation reaction with difficulty in the case where a sulfide solid electrolyte material containing Li, A (A is at least one kind of P, Si, Ge, Al and B) and S and having an ortho-composition is used for a material for an anode active material layer. The present invention has been made on the basis of such findings.

That is to say, the present invention provides a lithium solid state secondary battery system comprising: a lithium solid state secondary battery comprising a cathode having a cathode active material layer and a cathode current collector, an anode having an anode active material layer and an anode current collector, and a solid electrolyte layer formed between the above-mentioned cathode active material layer and the above-mentioned anode active material layer; and an overdischarge treating unit for discharging until SOC of the above-mentioned lithium solid state secondary battery becomes in a lower state than 0%, wherein the above-mentioned anode active material layer contains an anode active material and a sulfide solid electrolyte material containing Li, A (A is at least one kind of P, Si, Ge, Al and B) and S and having an ortho-composition, and the above-mentioned anode current collector comprises a metal.

According to the present invention, the anode of the lithium solid state secondary battery has the anode active material layer containing the sulfide solid electrolyte material having an ortho-composition, so that the above-mentioned sulfidation reaction may be appropriately inhibited also in the case of performing overdischarge for the lithium solid state secondary battery. Therefore, the anode current collector and the anode active material layer may be prevented from deteriorating due to the sulfidation reaction. Accordingly, the lithium solid state secondary battery system of the present invention may decrease internal resistance to restore output characteristics without deteriorating an anode by overdischarging the lithium solid state secondary battery by the overdischarge treating unit. Thus, a longer life of the lithium solid state secondary battery is intended.

The present invention provides a lithium solid state secondary battery system comprising: a lithium solid state secondary battery comprising a cathode having a cathode active material layer and a cathode current collector, an anode having an anode active material layer and an anode current collector, and a solid electrolyte layer formed between the above-mentioned cathode active material layer and the above-mentioned anode active material layer; and an overdischarge treating unit for discharging until in a case where a cathode potential before a cathode active material contained in the above-mentioned cathode active material layer emits a metal ion is regarded as Ep (V), a cathode potential becomes a lower electric potential than the above-mentioned Ep (V), wherein the above-mentioned anode active material layer contains an anode active material and a sulfide solid electrolyte material containing Li, A (A is at least one kind of P, Si, Ge, Al and B) and S and having an ortho-composition, and the above-mentioned anode current collector comprises a metal.

According to the present invention, the anode of the lithium solid state secondary battery has the anode active material layer containing the sulfide solid electrolyte material having an ortho-composition, so that the above-mentioned sulfidation reaction may be appropriately inhibited also in the case of performing overdischarge for the lithium solid state secondary battery. Therefore, the anode current collector and the anode active material layer may be prevented from deteriorating due to the sulfidation reaction. Accordingly, the lithium solid state secondary battery system of the present invention may decrease internal resistance to restore output characteristics without deteriorating an anode by overdischarging the lithium solid state secondary battery by the overdischarge treating unit. Thus, a longer life of the lithium solid state secondary battery is intended.

The present invention provides a lithium solid state secondary battery system comprising: a lithium solid state secondary battery comprising a cathode having a cathode active material layer containing an active material with a battery reaction at 3 V or more with respect to an Li electric potential and a cathode current collector, an anode having an anode active material layer containing an Li-containing metal active material or a carbon active material and an anode current collector, and a solid electrolyte layer formed between the above-mentioned cathode active material layer and the above-mentioned anode active material layer; and an overdischarge treating unit for discharging a voltage of the above-mentioned lithium solid state secondary battery to less than 2.5 V, wherein the above-mentioned anode active material layer contains a sulfide solid electrolyte material containing Li, A (A is at least one kind of P, Si, Ge, Al and B) and S and having an ortho-composition, and the above-mentioned anode current collector comprises a metal.

According to the present invention, the anode of the lithium solid state secondary battery has the anode active material layer containing the sulfide solid electrolyte material having an ortho-composition, so that the above-mentioned sulfidation reaction may be appropriately inhibited also in the case of performing overdischarge for the lithium solid state secondary battery. Therefore, the anode current collector and the anode active material layer may be prevented from deteriorating due to the sulfidation reaction. Accordingly, the lithium solid state secondary battery system of the present invention may decrease internal resistance to restore output characteristics without deteriorating an anode by overdischarging the lithium solid state secondary battery by the overdischarge treating unit. Thus, a longer life of the lithium solid state secondary battery is intended.

In the present invention, the above-mentioned A of the above-mentioned sulfide solid electrolyte material is preferably P.

In the present invention, the above-mentioned overdischarge treating unit is preferably an external short circuit unit for externally short-circuiting the above-mentioned lithium solid state secondary battery.

The present invention preferably has a plurality of the above-mentioned lithium solid state secondary batteries, and a selection control unit for selectively controlling so that the above-mentioned overdischarge treating unit functions on only a part of the above-mentioned lithium solid state secondary batteries. The reason therefor is to allow electric power to be supplied by other batteries while performing overdischarge treatment for a part of the lithium solid state secondary batteries.

In the present invention, at least one of the above-mentioned cathode active material layer and the above-mentioned solid electrolyte layer preferably contains the sulfide solid electrolyte material. The reason therefor is that the sulfide solid electrolyte material is so high in reactivity that a high-resistance film is easily produced at an interface with an active material (such as an oxide active material), and the effect of the present invention is easily performed.

In the present invention, the above-mentioned cathode active material layer preferably contains a cathode active material coated with an ion conductive oxide. The reason therefor is to allow a high-resistance film to be prevented from being formed at an interface between the cathode active material and another material (such as a solid electrolyte material).

Advantageous Effects of Invention

The lithium solid state secondary battery system of the present invention produces the effect such as to allow the decrease of output characteristics to be restored without deteriorating an anode.

DESCRIPTION OF EMBODIMENTS

A lithium solid state secondary battery system of the present invention is hereinafter described. The lithium solid state secondary battery system of the present invention comprises a lithium solid state secondary battery and an overdischarge treating unit, wherein an anode active material layer contains an anode active material and a sulfide solid electrolyte material containing Li, A (A is at least one kind of P, Si, Ge, Al and B) and S and having an ortho-composition, and an anode current collector comprises a metal.

Figure 1:
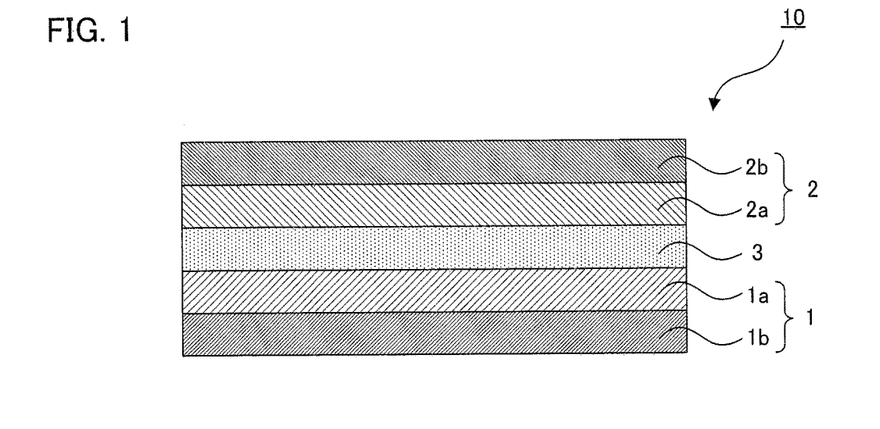
FIG. 1 is a schematic cross-sectional view showing an example of a lithium solid state secondary battery in the present invention.

FIG. 1 is a schematic cross-sectional view showing an example of a general lithium solid state secondary battery. As shown in FIG. 1, a lithium solid state secondary battery 10 comprises a cathode 1 having a cathode active material layer 1a and a cathode current collector 1b, an anode 2 having an anode active material layer 2a and an anode current collector 2b, and a solid electrolyte layer 3 formed between the cathode active material layer 1a and the anode active material layer 2a.

Next, the change of each electrode potential in the case of overdischarging the lithium solid state secondary battery 10 having the above-mentioned constitution is described while showing a specific example. For example, in the case where a cathode potential before the overdischarge (the initial state) is approximately 2.5 V vs. Li/Li$^+$ and an anode potential is approximately 1.8 V vs. Li/Li$^+$, the potential difference between the cathode and the anode before the overdischarge is 0.7 V vs. Li/Li$^+$. In the case of subjecting the lithium solid state secondary battery 10 to the overdischarge state, the above-mentioned potential difference changes from 0.7 V vs. Li/Li$^+$ to 0 V vs. Li/Li$^+$, for example. The reason therefor is that the overdischarge causes the cathode potential to drop from the electric potential before the overdischarge and the anode potential to rise from the electric potential before the overdischarge.

As described above, in the lithium solid state secondary battery using the anode having the anode active material layer containing the sulfide solid electrolyte material, typified by $Li_7P_3S_{11}$ conventionally used appropriately as a sulfide solid electrolyte material of a lithium solid state secondary battery, and the anode current collector comprising a metal, the problem is that overdischarging deteriorates the anode. The reason therefor is guessed as follows.

That is to say, the sulfide solid electrolyte material typified by $Li_7P_3S_{11}$ has a constitution containing cross-linking sulfur of an $S_3P$—S—$PS_3$ unit (a $P_2S_7$ unit) obtained by a reaction between $Li_2S$ and $P_2S_5$. Also, such cross-linking sulfur is high in reactivity.

Here, in the case of overdischarging the lithium secondary battery, as described above, the anode potential after the overdischarge becomes higher than the anode potential before the overdischarge. In the case of using metal as the anode current collector, a reaction with the above-mentioned cross-linking sulfur is caused with difficulty at the anode potential during an ordinary use of the battery; however, in the case where the anode potential rises due to the overdischarge, it is guessed that reactivity with the above-mentioned cross-linking sulfur becomes so high that a sulfidation reaction is promoted.

Therefore, in the case of overdischarging the lithium solid state secondary battery using the sulfide solid electrolyte material such as $Li_7P_3S_{11}$ for the anode active material layer, it is conceived that the presence of the two conditions that the sulfide solid electrolyte material contains cross-linking sulfur with high reactivity and that a sulfidation reaction is promoted by the rise of the anode potential causes the anode to deteriorate for the reason that the anode current collector is sulfurated to decrease ductility and malleability and the anode active material layer deteriorates.

On the other hand, a sulfide solid electrolyte material containing Li, A (A is at least one kind of P, Si, Ge, Al and B) and S and having an ortho-composition may be such as not to contain the above-mentioned cross-linking sulfur substantially. Therefore, even in the case where the overdischarging of the lithium solid state secondary battery brings a state of easily causing a sulfidation reaction by the rise of the anode potential, it is guessed that a sulfidation reaction is not actually caused between the anode current collector and the anode active material layer by reason of not containing cross-linking sulfur. Therefore, it is conceived that the anode may be prevented from deteriorating.

Therefore, according to the present invention, the anode of the lithium solid state secondary battery has the anode active material layer containing the above-mentioned sulfide solid electrolyte material having an ortho-composition, so that the above-mentioned sulfidation reaction may be appropriately inhibited also in the case of overdischarging the lithium solid state secondary battery. Therefore, the anode current collector and the anode active material layer may be prevented from deteriorating due to the sulfidation reaction. Accordingly, the lithium solid state secondary battery system of the present invention may decrease internal resistance to restore output characteristics without deteriorating an anode by overdischarging the lithium solid state secondary battery by the overdischarge treating unit. Thus, a longer life of the lithium solid state secondary battery is intended.

The details of the lithium solid state secondary battery system of the present invention are hereinafter described. Incidentally, the overdischarge treating unit may be specified more definitely from some viewpoints about the overdischarge treating unit, and the lithium solid state secondary battery of the present invention is specifically divided roughly into three embodiments. Each of the embodiments is hereinafter described.

I. First Embodiment

First, a lithium solid state secondary battery system of a first embodiment is described. The lithium solid state secondary battery system of the first embodiment comprises: a lithium solid state secondary battery comprising a cathode having a cathode active material layer and a cathode current collector, an anode having an anode active material layer and an anode current collector, and a solid electrolyte layer formed between the above-mentioned cathode active material layer and the above-mentioned anode active material layer; and an overdischarge treating unit for discharging until SOC of the above-mentioned lithium solid state secondary battery becomes in a lower state than 0%, wherein the above-mentioned anode active material layer contains an anode active material and a sulfide solid electrolyte material containing Li, A (A is at least one kind of P, Si, Ge, Al and B) and S and having an ortho-composition, and the above-mentioned anode current collector comprises a metal.

The lithium solid state secondary battery system of the first embodiment is described while using the drawings.

Figure 2:
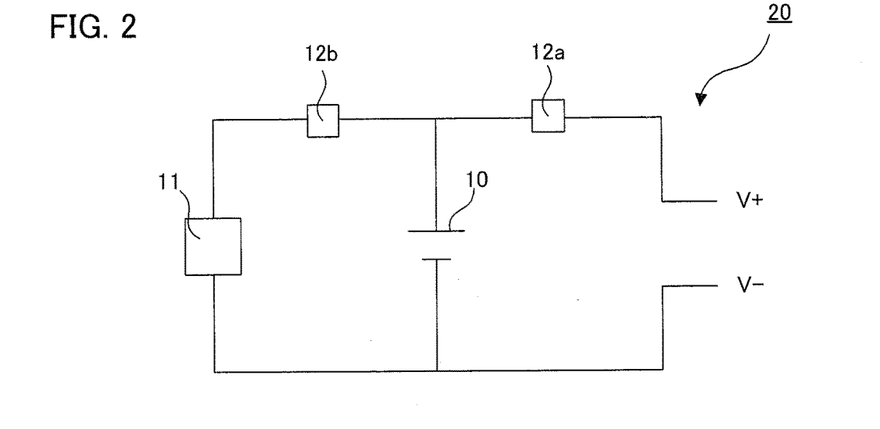
FIG. 2 is a schematic view showing an example of a lithium solid state secondary battery system of the present invention.

FIG. 2 is a schematic view showing an example of the lithium solid state secondary battery system of the first embodiment. A lithium solid state secondary battery system 20 shown in FIG. 2 comprises a lithium solid state secondary battery 10 and an overdischarge treating unit 11 for discharging until SOC (state of charge) of the lithium solid state secondary battery 10 becomes in a lower state than 0%. In FIG. 2, the overdischarge treating unit 11 short-circuits the lithium solid state secondary battery 10 externally. Incidentally, an external short circuit signifies that the cathode active material layer and the anode active material layer are short-circuited through an external circuit. During an ordinary discharge, a switch unit 12a is turned on and a switch unit 12b is turned off, and the lithium solid state secondary battery 10 is discharged. On the other hand, during overdischarge treatment, the switch unit 12a is turned off and the switch unit 12b is turned on, and the lithium solid state secondary battery 10 is externally short-circuited. Incidentally, a control unit, which is not shown in the drawings, for controlling the switch units 12a and 12b in accordance with voltage is ordinarily provided. Also, a specific constitution of the lithium solid state secondary battery 10 may be the same as the above-mentioned constitution of the lithium solid state secondary battery 10 shown in FIG. 1; therefore, the description herein is omitted.

According to the first embodiment, the overdischarging of the lithium solid state secondary battery by the overdischarge treating unit may decrease internal resistance to restore output characteristics without deteriorating an anode. Thus, a longer life of the lithium solid state secondary battery is intended. It has been conventionally known that battery performance decreases due to overdischarge, so that an ordinary lithium solid state secondary battery is provided with an overdischarge protective means of preventing overdischarge. On the contrary, in the first embodiment, overdischarge treatment is positively performed for the lithium solid state secondary battery through cycle deterioration, so that internal resistance may be decreased to restore output characteristics.

Incidentally, a conductive device not provided with an overdischarge protective means for preventing a lithium secondary battery from being overdischarged is disclosed in claim 2 in Patent Literature 2. However, the technique described in Patent Literature 2 is not such as to perform "positive overdischarge treatment" in the same manner as the first embodiment.

Here, it is described that "it[It] was conceived that a mistake in measuring voltage during discharge brought overdischarge and polarity inversion to deteriorate the performance of a lithium secondary battery, which consequently might not be used. Thus, the above-mentioned technique was provided with a protective circuit for preventing overdischarge by monitoring the voltage of the battery during discharge. This protective circuit was so expensive as to be a factor of hindering a lower price of the lithium secondary battery. Also, even in the case of providing the protective circuit, it was desired that the simplification of the constitution might contribute to a lower price of the lithium secondary battery" in paragraph [0005] of Patent Literature 2. Also, it is described that "according [According] to the electric device of the present invention, the electrolyte of the lithium secondary battery is an inorganic solid electrolyte, so that even the lithium secondary battery to which overdischarge and polarity inversion were brought may be normally used thereafter by charging again" in paragraph [0008].

It is clear from this description that the invention described in Patent Literature 2 insistently presupposes the use of the battery in an ordinary voltage range, and does not intend "positive overdischarge treatment". That is to say, in Patent Literature 2, even in the case where overdischarge is temporarily caused by some disorder (such as an incidental accident), it is merely disclosed that the use of the inorganic solid electrolyte instead of the liquid electrolyte allows the protective circuit to be simplified, and "positive overdischarge treatment" is not intended. Or rather, in consideration of the disclosure of the electric device "provided with" the overdischarge protective means in claim 3 of Patent Literature 2, it is found that Patent Literature 2 is based on a conventional technical idea, that is, the prevention of a harmful effect due to overdischarge. Thus, it is conceived that those skilled in the art, who come in contact with Patent Literature 2, have a factor of hindrance in adopting the overdischarge treating unit for positively performing overdischarge treatment contrary to the conventional technical idea. Incidentally, the same fact applies to Patent Literature 1. Also, the solid state secondary battery system of the first embodiment has an excellent effect such as to allow internal resistance to be decreased by positively performing overdischarge treatment. This effect is an advantageous effect (an accidental kind of effect) not described in Patent Literatures 1 and 2.

Also, in the first embodiment, a mechanism for allowing internal resistance to be decreased by overdischarge treatment is guessed as follows. That is to say, in the lithium solid state secondary battery, a battery reaction is caused at a solid/solid interface, so that a new film (SEI, Solid Electrolyte Interphase) is produced at the interface, and the resistance of this film is so large as to consequently cause the increase of internal resistance. On the contrary, in the first embodiment, it is conceived that the performance of overdischarge treatment allows this film to be removed and allows internal resistance to be decreased. Also, there is a possibility that this film is produced at an optional solid/solid interface in the lithium solid state secondary battery, but it is conceived that the film is frequently produced particularly at an interface between the active material and the solid electrolyte material. The reason therefor is that the active material produces an active reaction of occluding and emitting a metal ion on a surface thereof, and the solid electrolyte material ordinarily has a large area contacting with the active material. Above all, it is conceived that the case where the active material and the solid electrolyte material is a combination such as to derive from compounds of different kinds from each other brings a tendency to easily produce the film. To take an example, it is conceived that an oxide active material (deriving from an oxide) and a sulfide solid electrolyte material (deriving from a sulfide) easily react relatively to easily produce the film.

The lithium solid state secondary battery system of the first embodiment is hereinafter described in each constitution.

1. Lithium Solid State Secondary Battery

A lithium solid state secondary battery in the first embodiment is described. The lithium solid state secondary battery in the first embodiment comprises a cathode having a cathode active material layer and a cathode current collector, an anode having an anode active material layer and an anode current collector, and a solid electrolyte layer formed between the cathode active material layer and the anode active material layer.

(1) Anode

The anode in the first embodiment is described.

(i) Anode Active Material Layer

The anode active material layer in the first embodiment has an anode active material, and a sulfide material containing Li, A (A is at least one kind of P, Si, Ge, Al and B) and S and having an ortho-composition.

(a) Sulfide Solid Electrolyte Material

The sulfide solid electrolyte material in the first embodiment is described. The above-mentioned sulfide solid electrolyte material contains Li, A (A is at least one kind or P, Si, Ge, Al and B) and S, and has an ortho-composition.

Here, ortho generally signifies oxo acid which is the highest in degree of hydration among oxo acids obtained by hydrating the same oxide. In the first embodiment, a composition to which $Li_2S$ is added most among sulfides is called an ortho-composition. For example, $Li_3PS_4$ corresponds to an ortho-composition in the $Li_2S$—$P_2S_5$ system, $Li_3AlS_3$ corresponds to an ortho-composition in the $Li_2S$—$Al_2S_3$ system, $Li_3BS_3$ corresponds to an ortho-composition in the $Li_2S$—$B_2S_3$ system, $Li_4SiS_4$ corresponds to an ortho-composition in the $Li_2S$—$SiS_2$ system, and $Li_4GeS_4$ corresponds to an ortho-composition in the $Li_2S$—$GeS_2$ system.

Also, in the first embodiment, "having an ortho-composition" includes not merely a strict ortho-composition but also a composition in the neighborhood of it. Specifically, "having an ortho-composition" signifies that an anion structure in an ortho-composition ($PS_4^{3-}$ structure, $SiS_4^{4-}$ structure, $GeS_4^{4-}$ structure, $AlS_3^{3-}$ structure and $BS_3^{3-}$ structure) is the main component. The ratio of an anion structure in an ortho-composition is preferably 60 mol % or more, more preferably 70 mol % or more, far more preferably 80 mol % or more, and particularly preferably 90 mol % or more with respect to all anion structures of the sulfide solid electrolyte material. Incidentally, the ratio of an anion structure in an ortho-composition may be determined by Raman spectroscopy, NMR and XPS.

The sulfide solid electrolyte material in the first embodiment is not particularly limited if the sulfide solid electrolyte material is such as to contain Li, A (A is at least one kind of P, Si, Ge, Al and B) and S, and have an ortho-composition, but the above-mentioned A is more preferably P.

The sulfide solid electrolyte material in the first embodiment is preferably obtained by using $Li_2S$ and a sulfide of A (A is at least one kind of P, Si, Ge, Al and B).

Also, $Li_2S$ contained in a raw material composition preferably has fewer impurities. The reason therefor is to allow a side reaction to be inhibited. Examples of a synthesis method for $Li_2S$ include a method described in JP-A No. H07-330312. In addition, $Li_2S$ is preferably purified by using a method described in WO 2005/040039. On the other hand, examples of the sulfide of the above-mentioned A contained in a raw material composition include $P_2S_3$, $P_2S_5$, $SiS_2$, $GeS_2$, $Al_2S_3$ and $B_2S_3$.

Also, it is preferable that the above-mentioned sulfide solid electrolyte material does not contain $Li_2S$ substantially. The reason therefor is to allow the sulfide solid electrolyte material with less hydrogen sulfide generation amount. $Li_2S$ reacts with water to generate hydrogen sulfide. For example, a larger ratio of $Li_2S$ contained in a raw material composition survives $Li_2S$ more easily. The fact that "it does not contain $Li_2S$ substantially" may be confirmed by X-ray diffraction. Specifically, in the case of not having a peak of $Li_2S$ ($2\theta$=27.0°, 31.2°, 44.8° and 53.1°), the fact that "it does not contain $Li_2S$ substantially" may be determined.

Also, it is preferable that the above-mentioned sulfide solid electrolyte material does not contain cross-linking sulfur substantially.

The reason therefor is to allow the sulfide solid electrolyte material with less hydrogen sulfide generation amount. "Cross-linking sulfur" signifies cross-linking sulfur in a compound obtained by a reaction of $Li_2S$ and the sulfide of the above-mentioned A.

For example, cross-linking sulfur with an $S_3P$—S—$PS_3$ structure obtained by a reaction of $Li_2S$ and $P_2S_5$ corresponds thereto. Such cross-linking sulfur reacts easily with the metal of the anode current collector to easily sulfurate the anode current collector. Also, such cross-linking sulfur reacts easily with water to easily generate hydrogen sulfide. In addition, the fact that "it does not contain cross-linking sulfur substantially" may be confirmed by measuring Raman spectroscopy. For example, in the case of an $Li_2S$—$P_2S_5$-based sulfide solid electrolyte material, a peak of an $S_3P$—S—$PS_3$ structure ordinarily appears at 402 $cm^{-1}$. Thus, it is preferable that this peak is not detected. Also, a peak of a $PS_4^{3-}$ structure ordinarily appears at 417 $cm^{-1}$. In the first embodiment, the intensity $I_{402}$ at 402 $cm^{-1}$ is preferably smaller than the intensity $I_{417}$ at 417 $cm^{-1}$. More specifically, the intensity $I_{402}$ is, for example, preferably 70% or less, more preferably 50% or less, and far more preferably 35% or less with respect to the intensity $I_{417}$. Also, with regard to a sulfide solid electrolyte material except $Li_2S$—$P_2S_5$-based, the fact that it does not contain cross-linking sulfur substantially may be determined by specifying a unit containing cross-linking sulfur to measure a peak of the unit.

In the case of an $Li_2S$—$P_2S_5$-based sulfide solid electrolyte material, the ratio of $Li_2S$ and $P_2S_5$ such as to allow the ortho-composition is $Li_2S:P_2S_5$=75:25 on a molar basis. The case of an $Li_2S$—$Al_2S_3$-based sulfide solid electrolyte material and the case of an $Li_2S$—$B_2S_3$-based sulfide solid electrolyte material are similar thereto. In the case of an $Li_2S$—$SiS_2$-based sulfide solid electrolyte material, the ratio of $Li_2S$ and $SiS_2$ such as to allow the ortho-composition is $Li_2S:SiS_2$=66.7:33.3 on a molar basis. The case of an $Li_2S$—$GeS_2$-based sulfide solid electrolyte material is similar thereto.

In the case where the above-mentioned raw material composition containing $Li_2S$ and $P_2S_5$, the ratio of $Li_2S$ to the total of $Li_2S$ and $P_2S_5$ is, for example, preferably within a range of 71 mol % to 79 mol %, more preferably within a range of 72 mol % to 78 mol %, and far more preferably within a range of 74 mol % to 76 mol %. Incidentally, the case where the above-mentioned raw material composition contains $Li_2S$ and $Al_2S_3$ and the case where the above-mentioned raw material composition contains $Li_2S$ and $B_2S_3$ are similar thereto. On the other hand, in the case where the above-mentioned raw material composition containing $Li_2S$ and $SiS_2$, the ratio of $Li_2S$ to the total of $Li_2S$ and $SiS_2$ is, preferably within a range of 62.5 mol % to 70.9 mol %, more preferably within a range of 63 mol % to 70 mol %, and far more preferably within a range of 64 mol % to 68 mol %. Incidentally, the case where the above-mentioned raw material composition contains $Li_2S$ and $GeS_2$ is similar thereto.

Also, the sulfide solid electrolyte material in the first embodiment preferably contains an X component (X is a halogen element) further. The reason therefor is to allow the sulfide solid electrolyte material with high Li ion conductivity. Above all, the above-mentioned sulfide solid electrolyte material preferably contains an LiX (X is a halogen element) component further. Incidentally, examples of the X include F, Cl, Br and I, preferably Cl, Br and I, and more preferably I. The ratio of LiX is, for example, preferably within a range of 1 mol % to 60 mol %, more preferably within a range of 5 mol % to 50 mol %, and far more preferably within a range of 10 mol % to 40 mol %. Here, in the case where the above-mentioned sulfide solid electrolyte material contains the LiX component further, the sulfide solid electrolyte material has a component having an ortho-composition (an ion conductor) and the LiX component. In the present invention, "sulfide solid electrolyte material having an ortho-composition" signifies that the sulfide solid electrolyte material is provided with at least the component having an ortho-composition (an ion conductor). Thus, even in the case of having the LiX component, if the sulfide solid electrolyte material has at least the component having an ortho-composition, the sulfide solid electrolyte material is conceived to be the sulfide solid electrolyte material having an ortho-composition. In this manner, the above-mentioned sulfide solid electrolyte material may contain only Li, A and S, or contain another component (such as X) further. Incidentally, the sulfide solid electrolyte material preferably has the component having an ortho-composition as the main component.

Examples of the shape of the sulfide solid electrolyte material in the first embodiment include a particulate shape. The average particle diameter of the particulate sulfide solid electrolyte material is, for example, preferably within a range of 0.1 µm to 50 µm. Also, the above-mentioned sulfide solid electrolyte material is preferably high in Li ion conductivity, and Li ion conductivity at normal temperature is, for example, preferably $1 \times 10^{-4}$ S/cm or more, and more preferably $1 \times 10^{-3}$ S/cm or more.

Also, the sulfide solid electrolyte material may be sulfide glass, crystallized sulfide glass, or a crystalline material obtained by a solid phase method. Incidentally, the sulfide glass may be obtained by performing mechanical milling (such as ball mill) for a raw material composition, for example. Also, the crystallized sulfide glass may be obtained by heat-treating the sulfide glass at a temperature of crystallization temperature or higher, for example.

(b) Anode Active Material

Next, the anode active material in the first embodiment is described. The kind of the anode active material in the first embodiment is not particularly limited if the anode active material may occlude and emit a metal ion. Examples of the anode active material include a carbon active material, an oxide active material and a metal active material. The carbon active material is not particularly limited if the carbon active material is such as to contain carbon, but examples thereof include mesocarbon microbeads (MCMB), high orientation property graphite (HOPG), natural graphite, hard carbon and soft carbon. Examples of the oxide active material include $Nb_2O_5$, $Li_4Ti_5O_{12}$ and SiO. Examples of the metal active material include In, Al, Si, and Sn. Also, an Li-containing metal active material may be used as the anode active material. The Li-containing metal active material is not particularly limited if the Li-containing metal active material is an active material containing at least Li, but may be an Li metal or an Li alloy. Examples of the Li alloy include an alloy containing Li and at least one kind of In, Al, Si and Sn.

Examples of the shape of the anode active material include a particulate shape and a thin-film shape. The average particle diameter ($D_{50}$) of the anode active material is, for example, preferably within a range of 1 nm to 100 µm, and more preferably within a range of 10 nm to 30 µm. Also, the content of the anode active material in the anode active material layer is not particularly limited but is, for example, preferably within a range of 40% by weight to 99% by weight.

(c) Anode Active Material Layer

The anode active material layer in the first embodiment is not particularly limited if the anode active material layer is such as to contain the above-mentioned sulfide solid electrolyte material and anode active material, but may further contain at least one of a solid electrolyte material except the above-mentioned sulfide solid electrolyte material, a conductive material and a binder as required. Incidentally, the solid electrolyte material is described in the after-mentioned section "(3) Solid electrolyte layer". The content of the solid electrolyte material in the anode active material layer is not particularly limited but is, for example, preferably within a range of 10% by weight to 90% by weight.

The conductive material allows electron conductivity of the anode active material layer to be improved by being added to the anode active material layer. Examples of the conductive material include acetylene black, Ketjen Black and carbon fiber. Also, the binder allows the anode active material layer excellent in flexibility by being added to the anode active material layer. Examples of the binder include fluorine-containing binders such as BR (butadiene rubber), PTFE and PVDF.

The thickness of the anode active material layer is, for example, preferably within a range of 0.1 µm to 1000 µm, and more preferably within a range of 1 µm to 100 µm.

(ii) Anode Current Collector

The anode current collector in the first embodiment comprises a metal. The metal used for the anode current collector is not particularly limited if the metal may perform current collecting of the anode active material layer, but a metal sulfide is preferably energetically stable. Alternatively, an energy difference between a metal oxide and a metal sulfide is preferably small on the metal surface. The reason therefor is that the metal oxide formed on the metal surface is easily substituted with the metal sulfide in this case. Also, examples of such a metal include copper, nickel, stainless steel, vanadium, manganese, iron, titanium, cobalt, zinc and silver. In the first embodiment, copper, nickel, iron and silver are preferable above all. The reason therefor is that these metals have the property of reacting easily with sulfur to be easily sulfurated. Also, in the first embodiment, the anode current collector is particularly preferably copper. The reason therefor is that copper is excellent in electrical conductivity and excellent in current collectivity.

Here, as described above, in the case of using the metal as the anode current collector, a reaction with the above-mentioned cross-linking sulfur is caused with difficulty at the anode potential during an ordinary use of the battery; however, in the case where the anode potential rises due to the overdischarge, it is guessed that reactivity with the above-mentioned cross-linking sulfur becomes so high that a sulfidation reaction is promoted. Also, the reason therefor is guessed as follows.

That is to say, it is guessed that the sulfidation reaction of the anode current collector is caused for the reason that the electric potential of the anode current collector becomes a predetermined electric potential (hereinafter referred to as a sulfidation potential) or more. Thus, the anode potential before the overdischarge is so smaller than the above-mentioned sulfidation potential that the above-mentioned sulfidation reaction is caused with difficulty; on the other hand, in the case of overdischarging, it is conceived that the anode potential rises to the above-mentioned sulfidation potential or more, so that the above-mentioned sulfidation reaction is promoted. Therefore, with regard to the metal used for the anode current collector, it is guessed that the metal such that the above-mentioned sulfidation potential is smaller causes the sulfidation reaction more easily.

Then, in the first embodiment, the sulfidation potential of the metal is previously measured, and the metal used for the current collector may be also selected by using the obtained result in accordance with uses of the lithium solid state secondary battery system of the first embodiment.

Incidentally, the sulfidation potential may be obtained by the following measuring method, for example.

First, an evaluation sample such that the target anode current collector material is used for a working electrode, a metal Li foil is used for a counter electrode and the sulfide solid electrolyte is inserted between the electrodes is produced, and subsequently cyclic voltammetry (CV) measurement of the above-mentioned evaluation sample is performed in a dual-electrode method at a temperature of 25° C. by using a general electrode measuring apparatus to confirm an electric potential at which an oxidation current peak is caused. In the embodiment, the above-mentioned electric potential at which an oxidation current peak is caused is defined as the sulfidation potential.

The shape and thickness of the above-mentioned anode current collector are not particularly limited if the shape and thickness are such as to be capable of performing current collecting of the anode active material layer, but are preferably selected properly in accordance with factors such as uses of the lithium solid state secondary battery system of the first embodiment.

(2) Cathode

The cathode in the first embodiment has a cathode active material layer and a cathode current collector.

(i) Cathode Active Material Layer

The cathode active material layer in the first embodiment is a layer containing at least the cathode active material, and may further contain at least one of a solid electrolyte material, a conductive material and a binder as required. Kinds of the cathode active material are properly selected in accordance with kinds of the lithium solid state secondary battery, and examples thereof include an oxide active material and a sulfide active material. Examples of the cathode active material used for the lithium solid state secondary battery include bed type cathode active materials such as $LiCoO_2$, $LiNiO_2$, $LiCo_{1/3}Ni_{1/3}Mn_{1/3}O_2$, $LiVO_2$ and $LiCrO_2$, spinel type cathode active materials such as $LiMn_2O_4$, $Li(Ni_{0.25}Mn_{0.75})_2O_4$, $LiCoMnO_4$ and $Li_2NiMn_3O_8$, olivine type cathode active materials such as $LiCoPO_4$, $LiMnPO_4$ and $LiFePO_4$, and NASICON type cathode active materials such as $Li_3V_2P_3O_{12}$.

Examples of the shape of the cathode active material include a particulate shape and a thin-film shape. The average particle diameter ($D_{50}$) of the cathode active material is, for example, preferably within a range of 1 nm to 100 μm, and more preferably within a range of 10 nm to 30 μm. Also, the content of the cathode active material in the cathode active material layer is not particularly limited but is, for example, preferably within a range of 40% by weight to 99% by weight.

The cathode active material is preferably coated with an ion conductive oxide. The reason therefor is to allow a high-resistance film to be prevented from being formed at an interface between the cathode active material and another material (such as a solid electrolyte material). Examples of the Li ion conductive oxide include an Li ion conductive oxide represented by a general formula $Li_xAO_y$ (therein, A is B, C, Al, Si, P, S, Ti, Zr, Nb, Mo, Ta or W, and "x" and "y" are positive numbers). Specific examples include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. Also, the Li ion conductive oxide may be a composite compound. Such a composite compound may adopt any optional combination of the above, and specific examples thereof include $Li_4SiO_4$—$Li_3BO_3$ and $Li_4SiO_4$—$Li_3PO_4$. Also, the ion conductive oxide may coat at least part of the cathode active material or the whole surface of the cathode active material. Also, the thickness of the ion conductive oxide coating the cathode active material is, for example, preferably within a range of 0.1 nm to 100 nm, and more preferably within a range of 1 nm to 20 nm. Incidentally, examples of a measuring method for the thickness of the ion-conductive oxide include a transmission electron microscope (TEM).

The cathode active material layer may contain a solid electrolyte material. The addition of the solid electrolyte material allows ion conductivity of the cathode active material layer to be improved. Incidentally, the solid electrolyte material is described in the after-mentioned section "(3) Solid electrolyte layer". The content of the solid electrolyte material, in the cathode active material layer is not particularly limited but is, for example, preferably within a range of 10% by weight to 90% by weight. Incidentally, a conductive material and a binder used for the cathode active material layer are the same as the contents described in the above-mentioned section "(i) Anode active material layer"; therefore, the description herein is omitted. The thickness of the cathode active material layer is, for example, preferably within a range of 0.1 μm to 1000 μm, and more preferably within a range of 1 μm to 100 μm.

(ii) Cathode Current Collector

The cathode current collector in the first embodiment is not particularly limited if the cathode current collector may perform current collecting of the cathode active material layer, but examples thereof include SUS, aluminum, nickel, iron, titanium and carbon.

(3) Solid Electrolyte Layer

The solid electrolyte layer in the first embodiment is a layer containing at least a solid electrolyte material. The solid electrolyte material is not particularly limited if the solid electrolyte material has Li ion conductivity, but examples thereof include inorganic solid electrolyte materials such as a sulfide solid electrolyte material, an oxide solid electrolyte material and a nitride solid electrolyte material. The sulfide solid electrolyte material is preferable in view of being high in ion conductivity as compared with the oxide solid electrolyte material, and the oxide solid electrolyte material is preferable in view of being high in chemical stability as compared with the sulfide solid electrolyte material. Also, the solid electrolyte layer in the present invention may be an inorganic solid electrolyte material containing halogen.

In the first embodiment, the solid electrolyte layer is preferably the sulfide solid electrolyte material, above all. The reason therefor is that the sulfide solid electrolyte material is so high in reactivity that a high-resistance film is easily produced at an interface with an active material (such as an oxide active material), and the effect of the present invention is easily performed. Also, the sulfide solid electrolyte material is more preferably the sulfide solid electrolyte material having an ortho-composition described in the section of "(1) Anode". The reason therefor is to allow the generation of hydrogen sulfide to be decreased.

Also, a binder may be added to the solid electrolyte layer. Incidentally, the binder may be the same as described in the section of the above-mentioned "(1) Anode"; therefore, the description herein is omitted.

The thickness of the solid electrolyte layer is preferably, for example, within a range of 0.1 µm to 1000 µm, and above all, within a range of 0.1 µm to 300 µm.

(4) Other Members

The lithium solid state secondary battery in the first embodiment is not particularly limited if the lithium solid state secondary battery has the above-mentioned cathode, anode and solid electrolyte layer. Also, a battery case of a general lithium solid state secondary battery may be used for a battery case used for the first embodiment. Examples of the battery case include a battery case made of SUS.

(5) Lithium Solid State Secondary Battery

The lithium solid state secondary battery in the first embodiment is useful as a car-mounted battery by reason of being repeatedly charged and discharged. Examples of the shape of the lithium solid state secondary battery include a coin shape, a laminate shape, a cylindrical shape and a rectangular shape. Also, a producing method for the lithium solid state secondary battery is not particularly limited if the method is such as to allow the above-mentioned lithium solid state secondary battery, but the sane method as a producing method for a general lithium solid state secondary battery may be used. Examples thereof include a press method, a coating method, an evaporation method and a spray method.

2. Overdischarge Treating Unit

An overdischarge treating unit in the first embodiment discharges until SOC of the lithium solid state secondary battery becomes in a lower state than 0%. Here, SOC of the lithium solid state secondary battery prescribes working voltage of the battery and is determined in each battery from the viewpoint of safety and performance degradation prevention. In the first embodiment, that SOC becomes in a lower state than 0% is defined as a state of overdischarge. The overdischarge treating unit discharges preferably until SOC becomes −5% or less, more preferably until SOC becomes −10% or less, and far more preferably until SOC becomes −15% or less. The overdischarge treating unit discharges preferably until battery voltage becomes less than 2.5 V, more preferably until battery voltage becomes 2.0 V or less, far more preferably until battery voltage becomes 1.5 V or less, particularly preferably until battery voltage becomes 1 V or less, and most preferably until battery voltage becomes 0.5 V or less. Also, the overdischarge treating unit may discharge until battery voltage becomes 0 V, or discharge so that the battery is subject to polarity inversion (battery voltage becomes negative).

Figure 3:
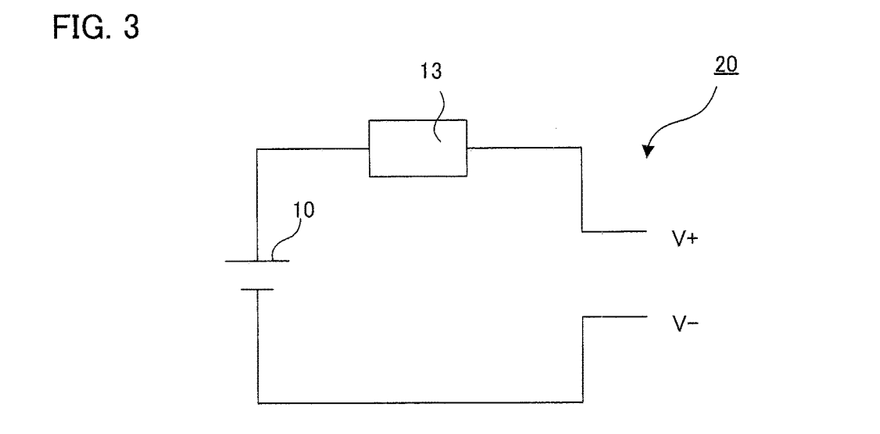
FIG. 3 is a schematic view showing another example of a lithium solid state secondary battery system of the present invention.

Examples of the overdischarge treating unit in the first embodiment, as shown in the above-mentioned FIG. 2, include the overdischarge treating unit 11 for externally short-circuiting the lithium solid state secondary battery 10. This overdischarge treating unit 11 is preferably a circuit having at least resistance. Also, other examples of the overdischarge treating unit, as shown in FIG. 3, include an overdischarge treating unit 13, which has a discharge control unit for stopping discharge at a predetermined voltage during an ordinary use of the battery and turns off a discharge control function during overdischarge treatment. Examples of the above-mentioned discharge control unit include a switch unit for stopping discharge by receiving a signal from a voltage measuring section for measuring voltage of the lithium solid state secondary battery.

3. Lithium Solid State Secondary Battery System

A lithium solid state secondary battery system of the first embodiment is not particularly limited if the lithium solid state secondary battery system is such as to comprise the above-mentioned overdischarge treating unit and lithium solid state secondary battery. Also, the lithium solid state secondary battery system may comprise one lithium solid state secondary battery or plural lithium solid state secondary batteries. Also, in the case where the lithium solid state secondary battery system comprises plural lithium solid state secondary batteries, each of the lithium solid state secondary batteries may be connected in series, in parallel or in a combination thereof.

Figure 4:
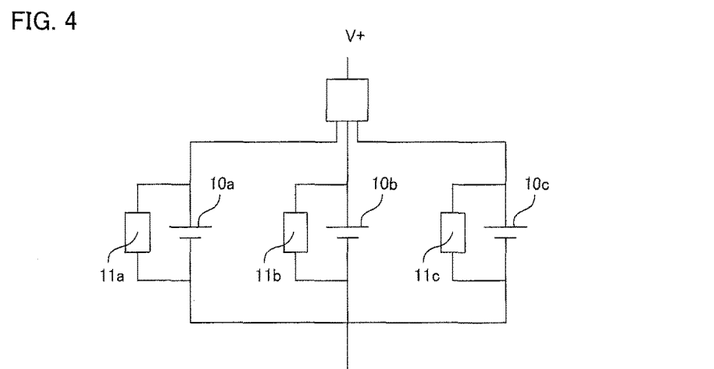
FIG. 4 is a schematic view showing still another example of a lithium solid state secondary battery system of the present invention.

The lithium solid state secondary battery system of the first embodiment preferably comprises plural lithium solid state secondary batteries, and a selection control unit for selectively controlling so that the overdischarge treating unit functions on only a part of the lithium solid state secondary batteries. The reason therefor is to allow electric power to be supplied by other batteries while performing overdischarge treatment for a part of the lithium solid state secondary batteries. Examples of such a lithium solid state secondary battery system, as shown in FIG. 4, include a lithium solid state secondary battery system comprising a selection control unit 14 for selectively controlling so that the overdischarge treating unit functions on only a part of the lithium solid state secondary batteries, in which system, overdischarge treating units 11a to 11c are connected to lithium solid state secondary batteries 10a to 10c, respectively.

II. Second Embodiment

Next, a lithium solid state secondary battery system of a second embodiment is described. The lithium solid state secondary battery system of the second embodiment comprises: a lithium solid state secondary battery comprising a cathode having a cathode active material layer and a cathode current collector, an anode having an anode active material layer and an anode current collector, and a solid electrolyte layer formed between the above-mentioned cathode active material layer and the above-mentioned anode active material layer; and an overdischarge treating unit for discharging until, in the case where a cathode potential before a cathode active material contained in the above-mentioned cathode active material layer emits a metal ion is regarded as Ep (V), a cathode potential becomes a lower electric potential than the above-mentioned Ep (V), wherein the above-mentioned anode active material layer contains an anode active material and a sulfide solid electrolyte material containing Li, A (A is at least one kind of P, Si, Ge, Al and B) and S and having an ortho-composition, and the above-mentioned anode current collector comprises a metal.

According to the second embodiment, the overdischarging of the lithium solid state secondary battery by the overdischarge treating unit may decrease internal resistance to restore output characteristics without deteriorating an anode. Thus, a longer life of the lithium solid state secondary battery is intended.

The overdischarge treating unit in the second embodiment discharges until, in the case where a cathode potential before the cathode active material contained in the cathode active material layer emits a metal ion is regarded as Ep (V), a cathode potential becomes a lower electric potential than the above-mentioned Ep (V). In the second embodiment, that a cathode potential becomes a lower electric potential than the Ep (V) is defined as a state of overdischarge. Here, the cathode potential Ep (V) varies with kinds of the cathode active material. For example, in the case of the cathode active material used for the lithium solid state secondary battery, the cathode potential Ep (V) is $LiNiO_2$ (3.55 V), $LiNi_{1/3}Co_{1/3}Mn_{1/3}O_2$ (3.65 V), $LiMn_{1.5}Ni_{0.5}O_4$ (3.7 V) and $LiCoO_2$ (3.65 V). Incidentally, any figure in the parentheses exhibits Ep. The overdischarge treating unit discharges preferably until a cathode potential becomes Ep-0.5 (V) or less, more preferably until a cathode potential becomes Ep-1 (V) or less, far more preferably until a cathode potential becomes Ep-1.5 (V) or less, and particularly preferably until a cathode potential becomes Ep-2 (V) or less. The cathode potential may be measured directly, or calculated from battery constitution and battery voltage. Also, for example, the overdischarge treating unit discharges preferably until battery voltage becomes less than 2.5 V, more preferably until battery voltage becomes 2.0 V or less, far more preferably until battery voltage becomes 1.5 V or less, particularly preferably until battery voltage becomes 1 V or less, and most preferably until battery voltage becomes 0.5 V or less. Also, the overdischarge treating unit may discharge until battery voltage becomes 0 V, or discharge so that the battery is subject to polarity inversion (battery voltage becomes negative).

Other items in the lithium solid state secondary battery system of the second embodiment are the same as the contents described in the above-mentioned first embodiment; therefore, the description herein is omitted.

III. Third Embodiment

Next, a lithium solid state secondary battery system of a third embodiment is described. The lithium solid state secondary battery system of the third embodiment comprises: a lithium solid state secondary battery having a cathode comprising a cathode active material layer containing an active material with a battery reaction at 3 V or more with respect to an Li electric potential and a cathode current collector, an anode having an anode active material layer containing an Li-containing metal active material or a carbon active material and an anode current collector, and a solid electrolyte layer formed between the above-mentioned cathode active material layer and the above-mentioned anode active material layer, and an overdischarge treating unit for discharging a voltage of the above-mentioned lithium solid state secondary battery to less than 2.5 V, wherein the above-mentioned anode active material layer contains a sulfide solid electrolyte material containing Li, A (A is at least one kind of P, Si, Ge, Al and B) and S and having an ortho-composition, and the above-mentioned anode current collector comprises a metal.

According to the third embodiment, the overdischarging of the lithium solid state secondary battery by the overdischarge treating unit may decrease internal resistance to restore output characteristics without deteriorating an anode. Thus, a longer life of the lithium solid state secondary battery is intended.

The cathode active material layer in the third embodiment contains an active material with a battery reaction at 3 V or more with respect to an Li electric potential. Examples of such an active material include bed type cathode active materials such as $LiCoO_2$, $LiNiO_2$, $LiCo_{1/3}Ni_{1/3}Mn_{1/3}O_2$, $LiVO_2$ and $LiCrO_2$, spinel type cathode active materials such as $LiMn_2O_4$, $Li(Ni_{0.25}Mn_{0.75})_2O_4$, $LiCoMnO_4$ and $Li_2NiMn_3O_8$, olivine type cathode active materials such as $LiCoPO_4$, $LiMnPO_4$ and $LiFePO_4$, and NASICON type cathode active materials such as $Li_3V_2P_3O_{12}$.

The anode active material layer in the third embodiment contains an Li-containing metal active material or a carbon active material. The Li-containing metal active material is not particularly limited if the Li-containing metal active material is an active material containing at least Li, but may be an Li metal or an Li alloy. Examples of the Li alloy include an alloy containing Li and at least one kind of In, Al, Si and Sn. Also, the carbon active material is not particularly limited if the carbon active material is such as to contain carbon, but examples thereof include mesocarbon microbeads (MCMB), high orientation property graphite (HOPG), hard carbon and soft carbon.

The overdischarge treating unit in the third embodiment discharges the battery voltage to less than 2.5 V, preferably until battery voltage becomes 2.0 V or less, more preferably until battery voltage becomes 1.5 V or less, far more preferably until battery voltage becomes 1 V or less, and particularly preferably until battery voltage becomes 0.5 V or less. Also, the overdischarge treating unit may discharge until battery voltage becomes 0 V, or discharge so that the battery is subject to polarity inversion (battery voltage becomes negative).

Other items in the lithium solid state secondary battery system of the third embodiment are the same as the contents described in the above-mentioned first embodiment; therefore, the description herein is omitted.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples and comparative examples hereinafter.

Incidentally, Examples and Comparative Examples are such that reactivity between a sulfide solid electrolyte material and an anode current collector is measured, and Reference Examples 1 and 2 are such that the change of output characteristics by overdischarge in a lithium secondary battery is measured.

EXAMPLES

Synthesis of Sulfide Solid Electrolyte Material

Lithium sulfide ($Li_2S$, manufactured by NIPPON CHEMICAL INDUSTRIAL CO., LTD.) and phosphorus pentasulfide ($P_2S_5$, manufactured by Sigma-Aldrich Japan K.K.) were used as a starting material. Next, $Li_2S$ and $P_2S_5$ were weighed in a glove box under an Ar atmosphere (dew-point temperature: −70° C.) so as to be a molar ratio of $75Li_2S \cdot 25P_2S_5$ ($Li_3PS_4$, ortho-composition). Mixed was 2 g of this mixture with an agate mortar for 5 minutes. Thereafter, 2 g of the obtained mixture was projected into a vessel of planetary ball mill (45 cc, made of $ZrO_2$), 4 g of dehydrated heptane (a moisture amount of 30 ppm or less) was projected thereinto, and 53 g of a $ZrO_2$ ball ($\phi$=5 mm) was projected thereinto to hermetically seal the vessel completely (Ar atmosphere). This vessel was mounted on a planetary ball mill machine (P7™ manufactured by FRITSCH JAPAN CO, LTD.) to perform mechanical milling at the number of soleplate revolutions of 500 rpm for 40 hours. Thereafter, the obtained test sample was dried on a hot plate so as to remove the heptane to obtain a sulfide solid electrolyte material (75Li$_2$S.25P$_2$S$_5$ glass).

(Production of Evaluation Cell)

Added was 65 mg of the above-mentioned sulfide solid electrolyte material to a metal mold of 1 cm$^2$ and pressed at a pressure of 4 ton/cm$^2$ to thereby form a sulfide solid electrolyte material layer. A metal copper foil with a thickness of 15 μm was put as a working electrode in the above-mentioned metal mold, and metal Li was put as a counter electrode therein to produce an evaluation cell by pressing at a pressure of 1 ton/cm$^2$.

Comparative Example

Li$_2$S and P$_2$S$_5$ were weighed so as to be a molar ratio of 70Li$_2$S.30P$_2$S$_5$ (Li$_7$P$_3$S$_{11}$) to obtain sulfide glass by performing mechanical milling in the same manner as Example. Thereafter, the obtained sulfide glass was heated in argon and crystallized. The heating conditions were the conditions of heating from room temperature to 260° C. at a rate of 10° C./minute to thereafter cool to room temperature. Thus, crystallized sulfide glass (sulfide solid electrolyte material) having a composition of 70Li$_2$S-30P$_2$S$_5$ was obtained. Incidentally, the obtained sulfide solid electrolyte material had a P$_2$S$_7^{4-}$ structure.

An evaluation cell was produced in the same manner as Example by using the above-mentioned sulfide solid electrolyte material.

Evaluations

Figure 5:
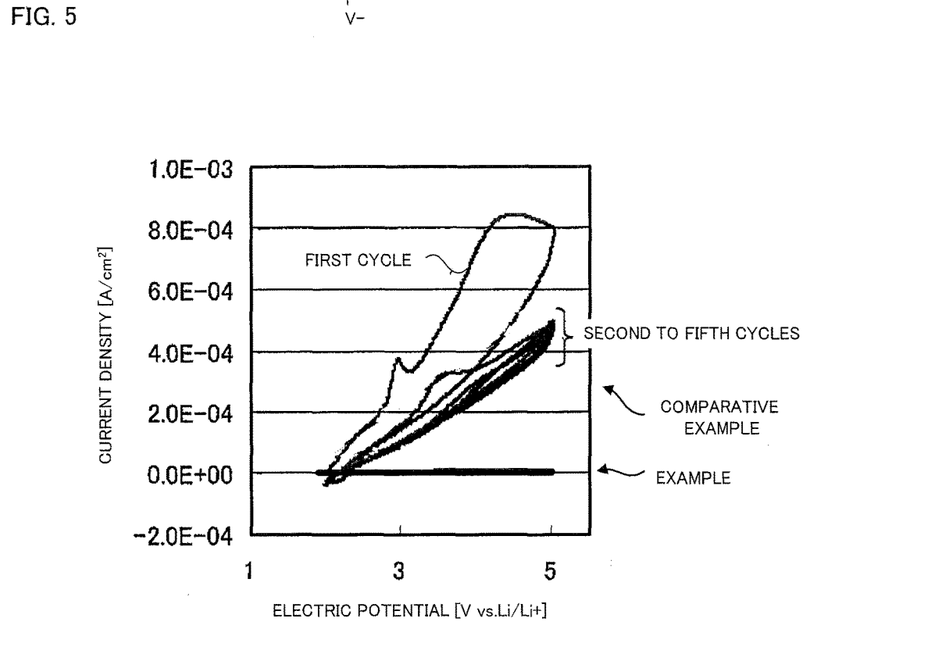
FIG. 5 is a result of measuring cyclic voltammetry obtained in example and comparative example.

Cyclic voltammetry measurement of five cycles at a rate of 10 mV/sec from a spontaneous potential to 5 V (vs Li/Li$^+$) was performed for the evaluation cells of Example and Comparative Example. The results are shown in FIG. 5. As shown in FIG. 5, in Example, the change of current density derived from the sulfidation reaction was not observed. On the other hand, in Comparative Example, the decrease of current density derived from the sulfidation reaction was observed between the first cycle and the second to fifth cycles.

Reference Example 1

Synthesis of Sulfide Solid Electrolyte Material

A sulfide solid electrolyte material (75Li$_2$S.25P$_2$S$_5$ glass) was obtained by the same synthesis method as Example.

(Production of Solid State Secondary Battery)

LiNi$_{1/3}$Co$_{1/3}$Mn$_{1/3}$O$_2$ (a cathode active material, manufactured by NICHIA CORPORATION), VGCF (vapor growth carbon fiber, a conductive material, manufactured by Showa Denko K.K.) and the above-mentioned sulfide solid electrolyte material were weighed by 12.03 mg, 0.51 mg and 5.03 mg respectively, and mixed to thereby obtain a cathode mixture.

Also, graphite (an anode active material, manufactured by Mitsubishi Chemical Corporation) and the above-mentioned sulfide solid electrolyte material were weighed by 9.06 mg and 8.24 mg respectively, and mixed to thereby obtain an anode mixture.

Next, 18 mg of the above-mentioned sulfide solid electrolyte material was added to a metal mold of 1 cm$^2$ and pressed at a pressure of 1 ton/cm$^2$ to thereby form a solid electrolyte layer. Added was 17.57 mg of the above-mentioned cathode mixture to one surface side of the obtained solid electrolyte layer, and pressed at a pressure of 1 ton/cm$^2$ to thereby form a cathode active material layer. Next, 17.3 mg of the above-mentioned anode mixture was added to the other surface side of the solid electrolyte layer, and pressed at a pressure of 4 ton/cm$^2$ to thereby obtain a power generating element. SUS304 (a cathode current collector, an anode current collector) was disposed on both surfaces of the obtained power generating element to obtain a solid state secondary battery.

(Measurement of Initial Resistance)

The obtained solid state secondary battery was constant-current charged to 4.2 V at 0.3 mA and thereafter constant-current discharged to 2.5 V at 0.3 mA. Next, the solid state secondary battery was charged to 3.6 V to adjust voltage, perform impedance analysis by an impedance analyzer (manufactured by Solartron), and then measure resistance (the initial stage).

(Preservation Test and Overdischarge Treatment)

After measuring the initial resistance, the solid state secondary battery was constant-voltage charged to 4.2 V and preserved at 60° C. for 30 days. After preserving, resistance (after 30 days) was measured by the same method as the above. Next, the solid state secondary battery was constant-current discharged to 0 V at 1.5 mA and constant-voltage discharged at 0 V for 10 hours. Thereafter, it was confirmed that open-circuit voltage was 0.5 V or less, and the solid state secondary battery was retained at 25° C. for 24 hours. After retaining, resistance (after 30 days, overdischarge treatment) was measured by the same method as the above.

(Resistivity)

Figure 6:
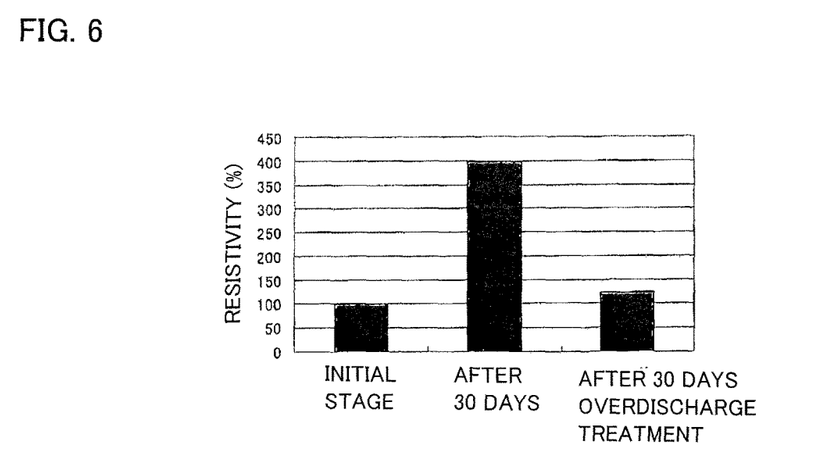
FIG. 6 is a result of resistivity against a lithium solid state secondary battery obtained in Reference Example 1.

Resistivity of the resistance (after 30 days) and the resistance (after 30 days, overdischarge treatment) was calculated on the basis of the resistance (the initial stage). The result is shown in FIG. 6. As shown in FIG. 6, the resistance (after 30 days) increased with respect to the resistance (the initial stage), but the resistance (after 30 days, overdischarge treatment) was restored to approximately the same level as the resistance (the initial stage). That is to say, it was confirmed that the performance of overdischarge treatment decreased internal resistance to improve output characteristics.

Reference Example 2

Production of Solid State Secondary Battery

A solid state secondary battery was obtained in the same manner as Reference Example 1 except for using an Al foil (manufactured by Nippon Foil Mfg. Co., Ltd.) and a Cu foil (manufactured by Nippon Foil Mfg. Co., Ltd.) as a cathode current collector and an anode current collector, respectively.

(Measurement of Initial Resistance)

Resistance (the initial stage) was measured in the same manner as Reference Example 1.

(Cycle Test and Overdischarge Treatment)

After measuring the initial resistance, constant-current charge and discharge (2.5 V to 4.2 V) at 60° C. and 6 mA was performed by 300 cycles and 500 cycles. After this charge and discharge, resistance (after 300 cycles) and resistance (after 500 cycles) were measured by the same method as the above. Next, the solid state secondary battery was constant-current discharged to 0 V at 1.5 mA and constant-voltage discharged at 0 V for 10 hours. Thereafter, it was confirmed that open-circuit voltage was 0.5 V or less, and the solid state secondary battery was retained at 25° C.

for 24 hours. After retaining, resistance (after 500 cycles, overdischarge treatment) was measured by the same method as the above.

(Resistivity)

Figure 7:
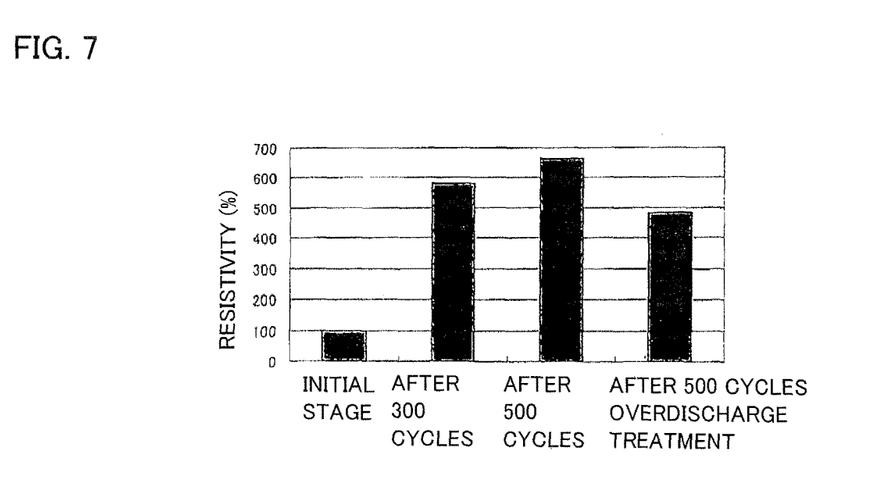
FIG. 7 is a result of resistivity against a lithium solid state secondary battery obtained in Reference Example 2.

Resistivity of the resistance (after 300 cycles), the resistance (after 500 cycles) and the resistance (after 500 cycles, overdischarge treatment) was calculated on the basis of the resistance (the initial stage). The result is shown in FIG. 7. As shown in FIG. 7, the resistance (after 300 cycles) and the resistance (after 500 cycles) increased with respect to the resistance (the initial stage), but the resistance (after 500 cycles, overdischarge treatment) was restored to a lower level than the resistance (after 300 cycles). That is to say, it was confirmed that the performance of overdischarge treatment decreased internal resistance to improve output characteristics.

REFERENCE SIGNS LIST

1 . . . Cathode
1a . . . Cathode active material layer
1b . . . Cathode current collector
2 . . . Anode
2a . . . Anode active material layer
2b . . . Anode current collector
3 . . . Solid electrolyte layer
10 . . . Lithium solid state secondary battery
11 . . . Overdischarge treating unit
12a, 12b . . . Switch unit
13 . . . Overdischarge treating unit
14 . . . Selection control unit
20 . . . Lithium solid state secondary battery system

The invention claimed is:

1. A lithium solid state secondary battery system comprising:
a lithium solid state secondary battery comprising a cathode having a cathode active material layer and a cathode current collector, an anode having an anode active material layer and an anode current collector, and a solid electrolyte layer formed between the cathode active material layer and the anode active material layer; and
an overdischarge treating unit for discharging until SOC of the lithium solid state secondary battery becomes in a lower state than 0%,
wherein the anode active material layer contains an anode active material and a sulfide solid electrolyte material containing Li, A and S and having an anion structure of an ortho-composition, where A is at least one selected from the group consisting of P, Si, Ge, Al and B,
a ratio of the anion structure of the ortho-composition is 60 mol % or more with respect to all anion structures of the sulfide solid electrolyte material, and
the anode current collector comprises a metal.

2. The lithium solid state secondary battery system according to claim 1, wherein the A of the sulfide solid electrolyte material is P.

3. The lithium solid state secondary battery system according to claim 1, wherein the overdischarge treating unit is an external short circuit unit for externally short-circuiting the lithium solid state secondary battery.

4. The lithium solid state secondary battery system according to claim 1, comprising a plurality of the lithium solid state secondary batteries, and a selection control unit for selectively controlling so that the overdischarge treating unit functions on only a part of the lithium solid state secondary batteries.

5. The lithium solid state secondary battery system according to claim 1, wherein at least one of the cathode active material layer and the solid electrolyte layer contains the sulfide solid electrolyte material.

6. The lithium solid state secondary battery system according to claim 1, wherein the cathode active material layer contains a cathode active material coated with an ion conductive oxide.

7. A lithium solid state secondary battery system comprising:
a lithium solid state secondary battery comprising a cathode having a cathode active material layer and a cathode current collector, an anode having an anode active material layer and an anode current collector, and a solid electrolyte layer formed between the cathode active material layer and the anode active material layer; and
an overdischarge treating unit for discharging until, in a case where a cathode potential before a cathode active material contained in the cathode active material layer emits a metal ion is regarded as Ep (V), a cathode potential becomes a lower electric potential than the Ep (V),
wherein the anode active material layer contains an anode active material and a sulfide solid electrolyte material containing Li, A and S and having an anion structure of an ortho-composition, where A is at least one selected from the group consisting of P, Si, Ge, Al and B,
a ratio of the anion structure of the ortho-composition is 60 mol % or more with respect to all anion structures of the sulfide solid electrolyte material, and
the anode current collector comprises a metal.

8. The lithium solid state secondary battery system according to claim 7, wherein the A of the sulfide solid electrolyte material is P.

9. The lithium solid state secondary battery system according to claim 7, wherein the overdischarge treating unit is an external short circuit unit for externally short-circuiting the lithium solid state secondary battery.

10. The lithium solid state secondary battery system according to claim 7, comprising a plurality of the lithium solid state secondary batteries, and a selection control unit for selectively controlling so that the overdischarge treating unit functions on only a part of the lithium solid state secondary batteries.

11. The lithium solid state secondary battery system according to claim 7, wherein at least one of the cathode active material layer and the solid electrolyte layer contains the sulfide solid electrolyte material.

12. The lithium solid state secondary battery system according to claim 7, wherein the cathode active material layer contains the cathode active material coated with an ion conductive oxide.

13. A lithium solid state secondary battery system comprising:
a lithium solid state secondary battery comprising a cathode having a cathode active material layer containing an active material with a battery reaction at 3 V or more with respect to an Li electric potential and a cathode current collector, an anode having an anode active material layer containing an Li-containing metal active material or a carbon active material and an anode current collector, and a solid electrolyte layer formed between the cathode active material layer and the anode active material layer; and an overdischarge treating unit for discharging a voltage of the lithium solid state secondary battery to less than 2.5 V, wherein the anode active material layer contains a sulfide solid electrolyte material containing Li, A and S and having an anion structure of an ortho-composition, where A is at least one selected from the group consisting of P, Si, Ge, Al and B, a ratio of the anion structure of the ortho-composition is 60 mol % or more with respect to all anion structures of the sulfide solid electrolyte material, and the anode current collector comprises a metal.

14. The lithium solid state secondary battery system according to claim 13, wherein the A of the sulfide solid electrolyte material is P.

15. The lithium solid state secondary battery system according to claim 13, wherein the overdischarge treating unit is an external short circuit unit for externally short-circuiting the lithium solid state secondary battery.

16. The lithium solid state secondary battery system according to claim 13, comprising a plurality of the lithium solid state secondary batteries, and a selection control unit for selectively controlling so that the overdischarge treating unit functions on only a part of the lithium solid state secondary batteries.

17. The lithium solid state secondary battery system according to claim 13, wherein at least one of the cathode active material layer and the solid electrolyte layer contains the sulfide solid electrolyte material.

18. The lithium solid state secondary battery system according to claim 13, wherein the cathode active material layer contains a cathode active material coated with an ion conductive oxide.

* * * * *